United States Patent
Lynn

[11] 3,844,050
[45] Oct. 29, 1974

[54] POSITION INDICATING DEVICE FOR VEHICLES

[76] Inventor: William E. Lynn, 209-A Millbrook Rd., Raleigh, N.C. 27609

[22] Filed: Sept. 28, 1973

[21] Appl. No.: 401,937

[52] U.S. Cl. .............................. 33/264, 116/28 R
[51] Int. Cl. ...................... B60r 27/00, G01c 15/00
[58] Field of Search ............ 33/263, 264, 286, 288, 33/293, 295; 116/28 R

[56] References Cited
UNITED STATES PATENTS

| | | | |
|---|---|---|---|
| 199,319 | 1/1878 | Schnell | 33/295 |
| 2,121,525 | 6/1938 | Johnson | 33/264 |
| 2,553,963 | 5/1951 | Dzus | 33/264 |
| 2,634,928 | 4/1953 | Hawes | 33/264 |
| 3,159,917 | 12/1964 | Whitehead | 33/264 |
| 3,765,703 | 10/1973 | Voelkerding et al. | 33/264 |

Primary Examiner—Louis R. Prince
Assistant Examiner—Richard R. Stearns
Attorney, Agent, or Firm—Clarence A. O'Brien; Harvey B. Jacobson

[57] ABSTRACT

An adjustable pointer device positioned on the fender of a vehicle, assists in the maneuvering of the vehicle to a position aligning the wheels with the tracks of a vehicle lift or a car wash facility. An overhead, suspended index target establishes a reference point toward which the pointer device is maneuvered.

12 Claims, 7 Drawing Figures

PATENTED OCT 29 1974　　3,844,050

POSITION INDICATING DEVICE FOR VEHICLES

This invention relates to apparatus for guiding movement of an automotive vehicle to a position in which the wheels of the vehicle are aligned with vehicle receiving tracks such as those associated with a vehicle lift or a car wash facility.

Many drivers of vehicles experience considerable difficulty in maneuvering the vehicle onto the tracks of a vehicle lift or a car wash facility since the wheels of the vehicle are out of the range of vision of the driver. For this reason, experienced personnel is required to take over operation of the vehicle in order to maneuver the same onto the tracks. Attempts by the ordinary vehicle driver to so maneuver the vehicle is not only time-consuming but sometimes results in damage to the vehicle because of track misalignment. This vehicle maneuvering difficulty presents a problem in busy establishments because of the shortage of personnel experienced in the handling of vehicles for such purposes. It is therefore an important object of the present invention to provide apparatus whereby the automotive vehicle may be guided to the proper position on the tracks of a vehicle lift or car wash facility.

In accordance with the present invention, a visual indicating device is mounted on the fender of a vehicle and adjustably positioned in operative alignment above the underlying vehicle wheel so as to guide movement of the vehicle to a position bringing the indicating device into close proximity to a target suspended overhead in alignment with the tracks on which the vehicle wheels are to be received. The visual indicating device includes a channel-shaped mounting element anchored to the fender by magnetic holding means in order to support an upwardly projecting shank having a pointer formation secured to its upper end. The shank of the pointer is connected by a ball-and-socket joint to a slide block so that the shank may be angularly adjusted to a vertical position regardless of the inclination of the mounting element dictated by the fender surface to which it is anchored by a magnetic holding element. The mounting element is positioned on the fender so as to extend transversely across a vertical plane extending centrally through the wheel disposed therebelow. The slide block from which the pointer shank projects upwardly, may therefore be slidably displaced by a measured amount in order to bring it to a position aligned with the vertical plane extending centrally through the wheel. Frictional means yieldably holds the slide block in an adjusted position. When the pointer associated with the indicator device is operatively positioned as aforementioned, the vehicle may be maneuvered in order to bring the pointer into close adjacency to an index target suspended from an overhead support in alignment with the track onto which the vehicle wheel is to be maneuvered.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
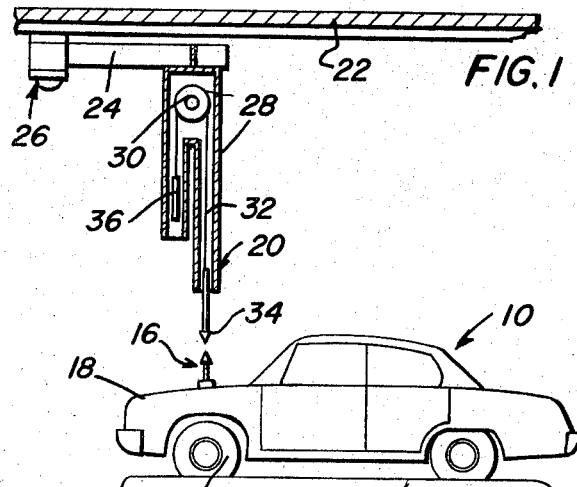
FIG. 1 is a side elevational view with parts shown in section of a typical installation for the apparatus of the present invention.

Referring now to the drawings in detail, FIG. 1 illustrates a typical installation for the apparatus of the present invention wherein an automotive vehicle generally denoted by reference numeral 10, has been properly maneuvered to a position with its wheels 12 received on the tracks 14 of a typical hydraulic vehicle lift usually provided in a vehicle repair and maintenance establishment. The vehicle 10 was guided to its position on the tracks 14 of the vehicle lift by means of an indicator device generally referred to by reference numeral 16 supported on the fender 18 above one of the front wheels 12. The indicator device 16 which is visible to the driver of the vehicle is brought into close proximity with an overhead target assembly generally referred to by reference numeral 20. The target assembly is suspended from the ceiling 22 of the vehicle repair and maintenance establishment by means of a support arm 24. The support arm 24 is pivotally secured to the ceiling by a pivot assembly 26 so that it may be pivotally displaced in a horizontal plane from a targeting position in which it is aligned with the track 14. In this manner, the targeting assembly 20 may be displaced out of the way after the vehicle has been properly positioned on the vehicle lift.

In the embodiment illustrated in FIG. 1, the targeting assembly 20 includes a housing 28 enclosing a pulley wheel 30 from which a cable 32 extends downwardly for suspending a target element 34. The other end of the cable entrained about the pulley 30, is connected to a counterweight 36 in order to hold the target element 34 in any vertically adjusted position. The target element 34 may therefore be vertically adjusted to a position adapted to closely overlie the indicator device 16 when operatively supported on the fender 18 of a vehicle which is to be guided onto the tracks 14.

Figure 4:
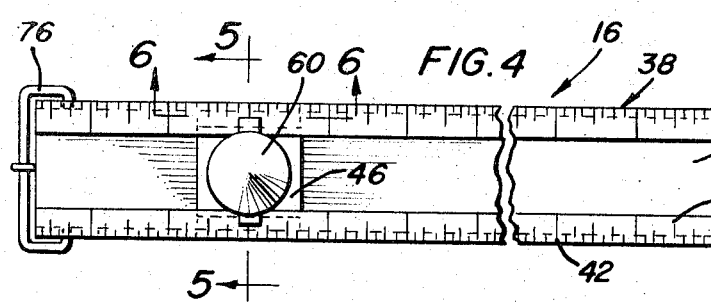
FIG. 4 is a top plan view of the indicator device per se.
Figure 5:
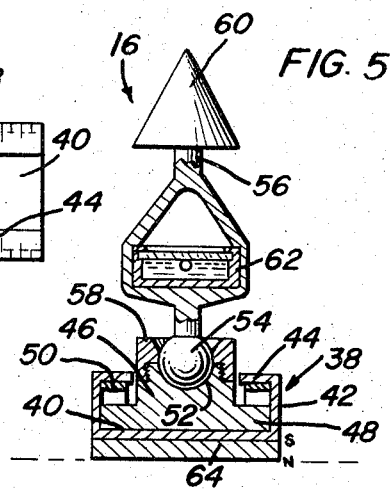
FIG. 5 is a transverse sectional view taken substantially through a plane indicated by section line 5—5 in FIG. 4.
Figure 6:
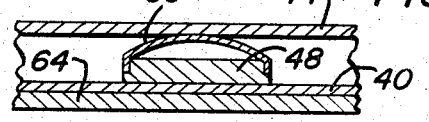
FIG. 6 is a partial sectional view taken substantially through a plane indicated by section line 6—6 in FIG. 4.

Referring now to FIGS. 4, 5 and 6, the indicator device 16 includes an elongated, channel-shaped mounting element generally referred to by reference numeral 38. The mounting element thus includes a bottom web 40 from which parallel sides 42 extend upwardly and are connected to spaced flanges 44 on which scale markings are formed in order to accommodate measured displacement of an adjustable slide block 46 slidably fitted within the channel of the mounting element 38. The slide block includes laterally extending portions 48 as more clearly seen in FIG. 5 underlying the top flanges 44 and mount frictional spring elements 50 adapted to frictionally engage the undersides of the flange elements 44 as more clearly seen in FIG. 6 in order to yieldably hold the slide block in any adjusted position.

The slide block is provided with a socket 52 receiving the ball formation 54 connected to the lower end of a shank 56 projecting upwardly from the slide block. A retainer 58 is threadedly mounted on the slide block as more clearly seen in FIG. 5 in order to hold the ball and socket joint assembled between the slide block and the shank 56, the upper end of which has a pointer formation 60 connected thereto. It will therefore be apparent that the shank 56 may be angularly adjusted to any desired position in which it is frictionally held by the retainer 58 of the ball-and-socket joint in order to position the shank parallel to a vertical plane. A level device 62 may optionally be secured to the shank in order to indicate the vertical position of the shank.

Figure 3:
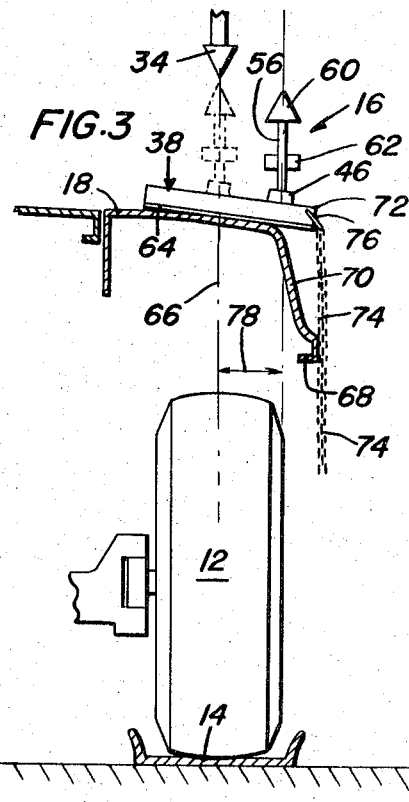
FIG. 3 is a side sectional view showing the indicator device mounted on the vehicle fender and being adjusted to an operative condition.

Angular adjustment of the shank relative to the slide block 46 is necessary in view of the inclination of the mounting element 38 from which it projects which in turn depends upon the curvature of the fender 18 on which it is supported as more clearly seen in FIG. 3. A magnetic element 64 is secured to the bottom web 40 of the mounting element in order to anchor the mounting element on the fender in a substantially stablized condition. It will of course be appreciated that the actual shape or curvature of the bottom of the mounting element or the magnetic holding element could be varied in order to accommodate the curvature of different vehicle fenders in order to obtain stabilized support. The mounting element must be supported in a stabilized condition on the fender extending transversely across a vertical plane extending centrally through the vehicle wheel 12 as indicated by line 66 in FIG. 3. With the shank 56 angularly adjusted to a vertical position, the pointer formation 60 may then be slidably displaced along the mounting element by means of the slide block 46 to an operative position aligned with the vertical plane 66.

Figure 2:
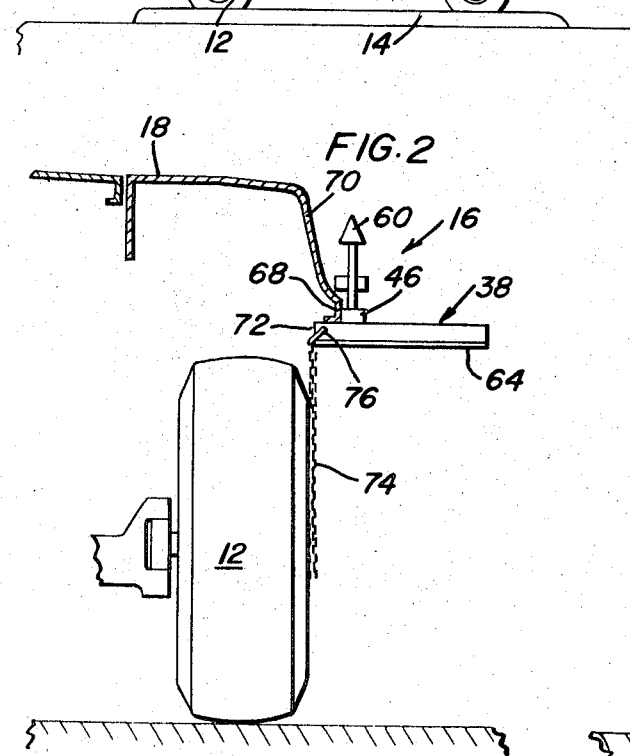
FIG. 2 is a section view through a portion of a typical vehicle showing an initial engaging step in the mounting of the indicator device on the vehicle fender.

In order to properly adjust and position the indicating device 16 on the fender of the vehicle, the mounting element is placed into contact with the edge portion 68 of the fender skirt 70 at a position along the longitudinal axis of the vehicle aligned with the axle of the wheel 12 or centrally of the wheel 12 as more clearly seen in FIG. 2. One end 72 of the mounting element is aligned with the outer axial side of the vehicle wheel spaced therebelow by means of a flexible gauging chain 74 pivotally suspended from the end 72 of the mounting element by a bail element 76. In this position of the mounting element 38 as shown in FIG. 2, the slide block 46 is brought into abutment with the edge portion 68 of the fender in order to establish an initial location from which the slide block is subsequently displaced by a measured amount substantially equal to one half the axial width of the wheel as indicated by reference numeral 78 in FIG. 3. Thus, after the mounting element is positioned against the lower edge portion 68 of the fender as shown in FIG. 2, in order to establish the initial location for the slide block 46, it is placed on top of the fender transversely across the vertical plane 66 as shown in FIG. 3. The slide block 46 is then displaced by the distance 78 along the mounting element. Standard data for different vehicle wheels may therefore be utilized in order to displace the slide block 46 by an amount measured by the scales formed on the top flanges 44 of the mounting element in order to adjust the slide block into an operative position aligned above the central vertical plane 66. The mounting element 38 must however be laterally positioned on the fender with its end 72 aligned with the edge portion 68 corresponding to the location to which the slide block 46 was initially displaced as aforementioned. Alignment of the end 72 with the edge portion 68 as shown in FIG. 3 is established by means of the gauging chain 74.

Figure 7:
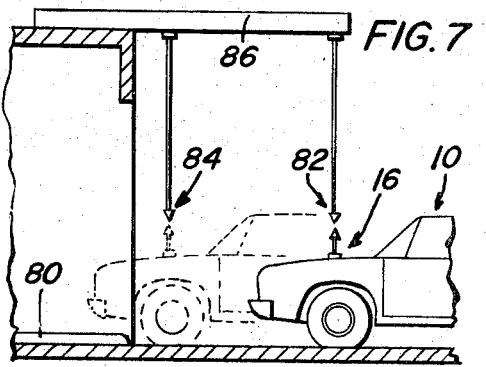
FIG. 7 is a side section view showing another type of installation for the apparatus of the present invention.

Utilizing the visual indicating device 16, as hereinbefore described, a vehicle may be guided onto the tracks 80 of a car wash facility as shown in FIG. 7. In this installation, a pair of targeting elements 82 and 84 aligned in a vertical longitudinal plane with the track 80, are pivotally suspended from an overhanging support 86. The indicating device 16 on the vehicle 10 is accordingly brought into proximity with the targeting elements 82 and 84 in sequence in order to obtain proper alignment of the vehicle wheels with the tracks 80. Adjustment and positioning of the indicating device 16 on the fender of the vehicle as shown in FIG. 7 is effected in the same manner as hereinbefore described with respect to the installation shown in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an overhead index target vertically aligned with a track on which a wheel of a vehicle is adapted to be received, a device adapted to be mounted on a fender of the vehicle overlying said wheel to assist maneuvering of the vehicle to a position in which the wheel is aligned with the track, comprising a mounting element adapted to be supported on said fender, adjustable means movably mounted on the mounting element and cooperating with scale means on said mounting element for measured displacement to an operative position intersected by a vertical plane substantially extending centrally through the wheel, and visual alignment means adjustably carried by said adjustable means for angular displacement relative to the mounting element whereby said visual alignment means is aligned with said vertical plane to indicate substantial alignment of said vertical plane with the index target.

2. The combination of claim 1 wherein said mounting element is elongated and includes anchoring means for holding said mounting element substantially stabilized on the fender extending transversely across said vertical plane.

3. The combination of claim 2 wherein said anchoring means comprises a magnetic holding device secured to the mounting element.

4. The combination of claim 2 including gauging means connected to the mounting element for initially positioning the adjustable means at a location on the mounting element from which the adjustable means is displaced to said operative position by moving said adjustable means a distance substantially equal to one-half the axial width of the wheel.

5. The combination of claim 4 wherein said visual alignment means includes a vertical shank having upper and lower ends, a pointer connected to the upper end of the shank and a ball-and-socket joint connecting the lower end of the shank to the adjustable means.

6. The combination of claim 5 wherein the adjustable means comprises a slide block, and friction means yieldably holding the slide block at an adjusted position on the mounting element.

7. The combination of claim 6 wherein said anchoring means comprises a magnetic holding device secured to the mounting element.

8. The combination of claim 1 including gauging means connected to the mounting element for initially positioning the adjustable means at a location on the mounting element from which the adjustable means is displaced to said operative position by moving said adjustable means a distance substantially equal to one-half the axial width of the wheel.

9. The combination of claim 8 wherein said gauging means includes a flexible element pivotally suspended at one end of the mounting element.

10. The combination of claim 1 wherein said visual alignment means includes a vertical shank having upper and lower ends, a pointer connected to the upper end of the shank and a ball-and-socket joint connecting the lower end of the shank to the adjustable means.

11. The combination of claim 1 wherein the adjustable means comprises a slide block, and friction means yieldably holding the slide block at an adjusted position on the mounting element.

12. A visual alignment indicating device adapted to be supported on the fender of a vehicle overlying a wheel, comprising an elongated mounting element, a slide block movably mounted on the mounting element, friction means yieldably holding the slide block at an adjusted position on the mounting element intersected by a vertical plane substantially extending centrally through the wheel, anchoring means for holding the mounting element substantially stabilized on the fender extending transversely across said vertical plane, a vertical shank having upper and lower ends, a pointer connected to the upper end of the shank and a ball-and-socket joint connecting the lower end of the shank to the slide block.

* * * * *